(12) United States Patent
Koarai

(10) Patent No.: US 10,599,317 B2
(45) Date of Patent: *Mar. 24, 2020

(54) INFORMATION PROCESSING APPARATUS

(71) Applicant: SHARP KABUSHIKI KAISHA, Sakai, Osaka (JP)

(72) Inventor: Shoji Koarai, Sakai (JP)

(73) Assignee: SHARP KABUSHIKI KAISHA, Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,296

(22) Filed: Feb. 22, 2019

(65) Prior Publication Data
US 2019/0187887 A1 Jun. 20, 2019

Related U.S. Application Data

(62) Division of application No. 14/326,936, filed on Jul. 9, 2014, now Pat. No. 10,241,662.

(30) Foreign Application Priority Data

Aug. 26, 2013 (JP) .................................. 2013-174352

(51) Int. Cl.
*G06F 3/0484* (2013.01)
*G06F 3/0486* (2013.01)
*G06F 3/0481* (2013.01)

(52) U.S. Cl.
CPC ........ *G06F 3/04847* (2013.01); *G06F 3/0481* (2013.01); *G06F 3/0486* (2013.01);
(Continued)

(58) Field of Classification Search
CPC ............... G06F 3/04847; G06F 3/0481; G06F 3/04842; G06F 3/0486
See application file for complete search history.

(56) References Cited

U.S. PATENT DOCUMENTS 7,480,872 B1  1/2009 Ubillos
7,739,604 B1  6/2010 Lyons et al.
(Continued)

FOREIGN PATENT DOCUMENTS

CN  103246433 A  8/2013
JP  2004-29046 A  1/2004
(Continued)

OTHER PUBLICATIONS

Advisory Action issued in corresponding U.S. Appl. No. 14/326,936 dated Jan. 23, 2017.
(Continued)

*Primary Examiner* — Angie Badawi
(74) *Attorney, Agent, or Firm* — Birch, Stewart, Kolasch & Birch, LLP

(57) ABSTRACT

An information processing apparatus is provided with a control portion that controls display of a predetermined display portion and an operation input portion (touch operation portion, mouse operation portion) that receives operation input by a user. The control portion displays a plurality of windows on the display portion and performs display control of the windows according to the operation input for the operation input portion. The control portion moves a specific window displayed on the display portion according to the operation input for the operation input portion, and when the window which is moved is superimposed on a different window and a predetermined condition is satisfied, displays the different window at a position of the window which is moved occupied before start of movement and displays the window which is being moved at a position of the different window to exchange the windows.

9 Claims, 9 Drawing Sheets

(52) U.S. Cl.
CPC ...... *G06F 3/04817* (2013.01); *G06F 3/04842* (2013.01); *G06F 2203/04803* (2013.01)

(56) References Cited

U.S. PATENT DOCUMENTS

| | | |
|---|---|---|
| 2011/0296329 A1 | 12/2011 | Tanaka |
| 2014/0002394 A1 | 2/2014 | Nancke-Krogh et al. |
| 2014/0164990 A1 | 6/2014 | Kim et al. |

FOREIGN PATENT DOCUMENTS

| | | |
|---|---|---|
| JP | 2010-218114 A | 9/2010 |
| JP | 2011-248784 A | 12/2011 |
| JP | 2012-27891 A | 2/2012 |

OTHER PUBLICATIONS

Final Office Action issued in corresponding U.S. Appl. No. 14/326,936 dated Sep. 6, 2016.
Non-Final Office Action issued in corresponding U.S. Appl. No. 14/326,936 dated May 13, 2016.
Non-Final Office Action issued in corresponding U.S. Appl. No. 14/326,936 dated May 25, 2018.
Notice of Allowance issued in corresponding U.S. Appl. No. 14/326,936 dated Nov. 8, 2018.

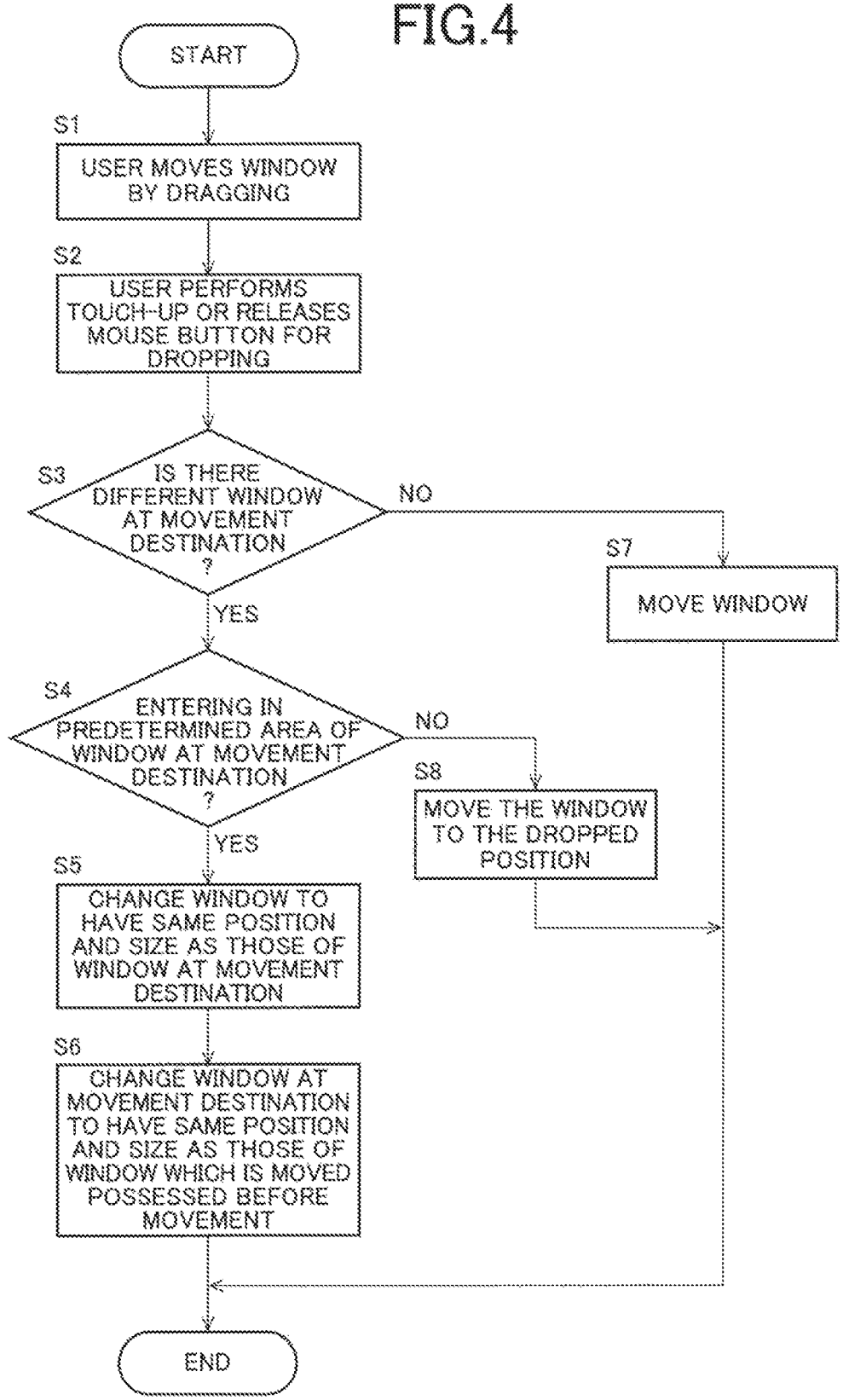

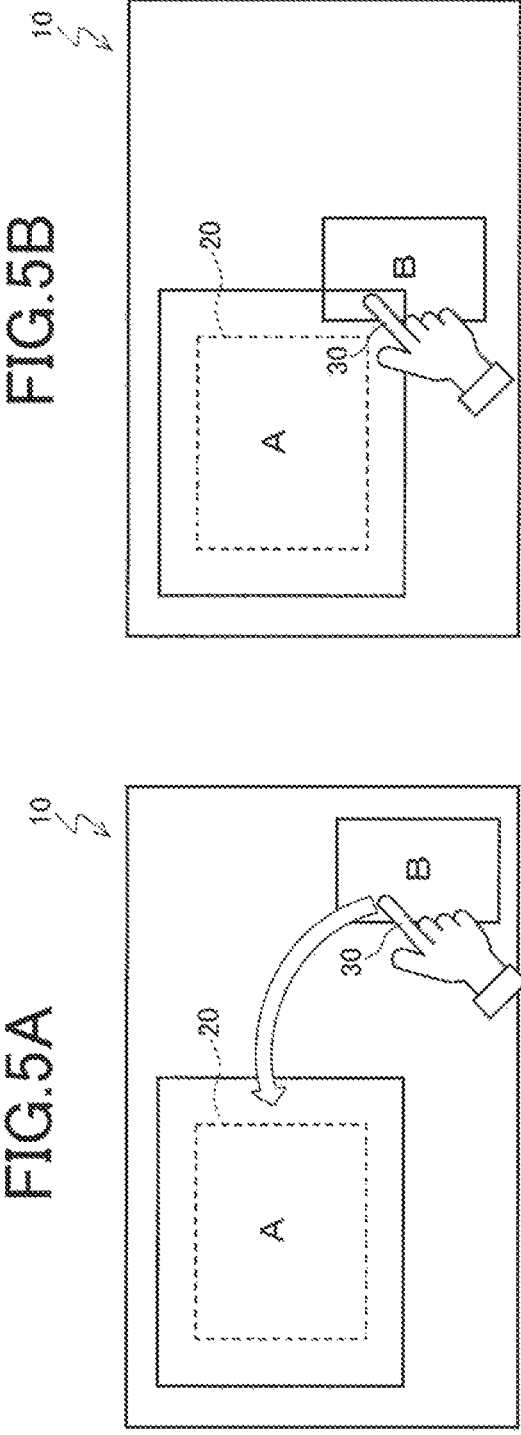
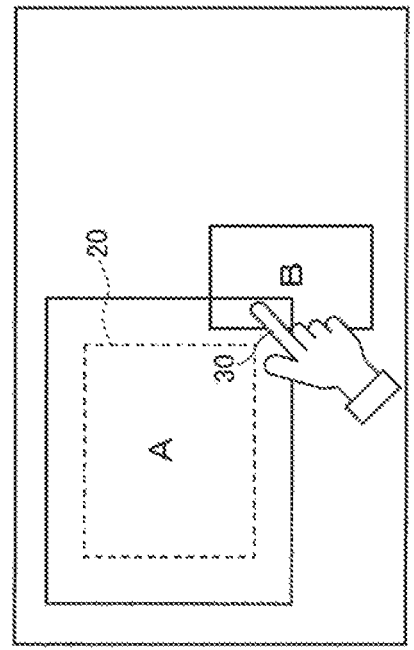
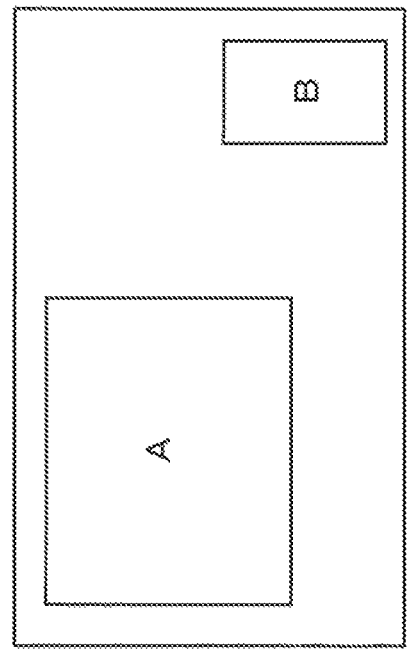
FIG.5A
FIG.5B
FIG.5C

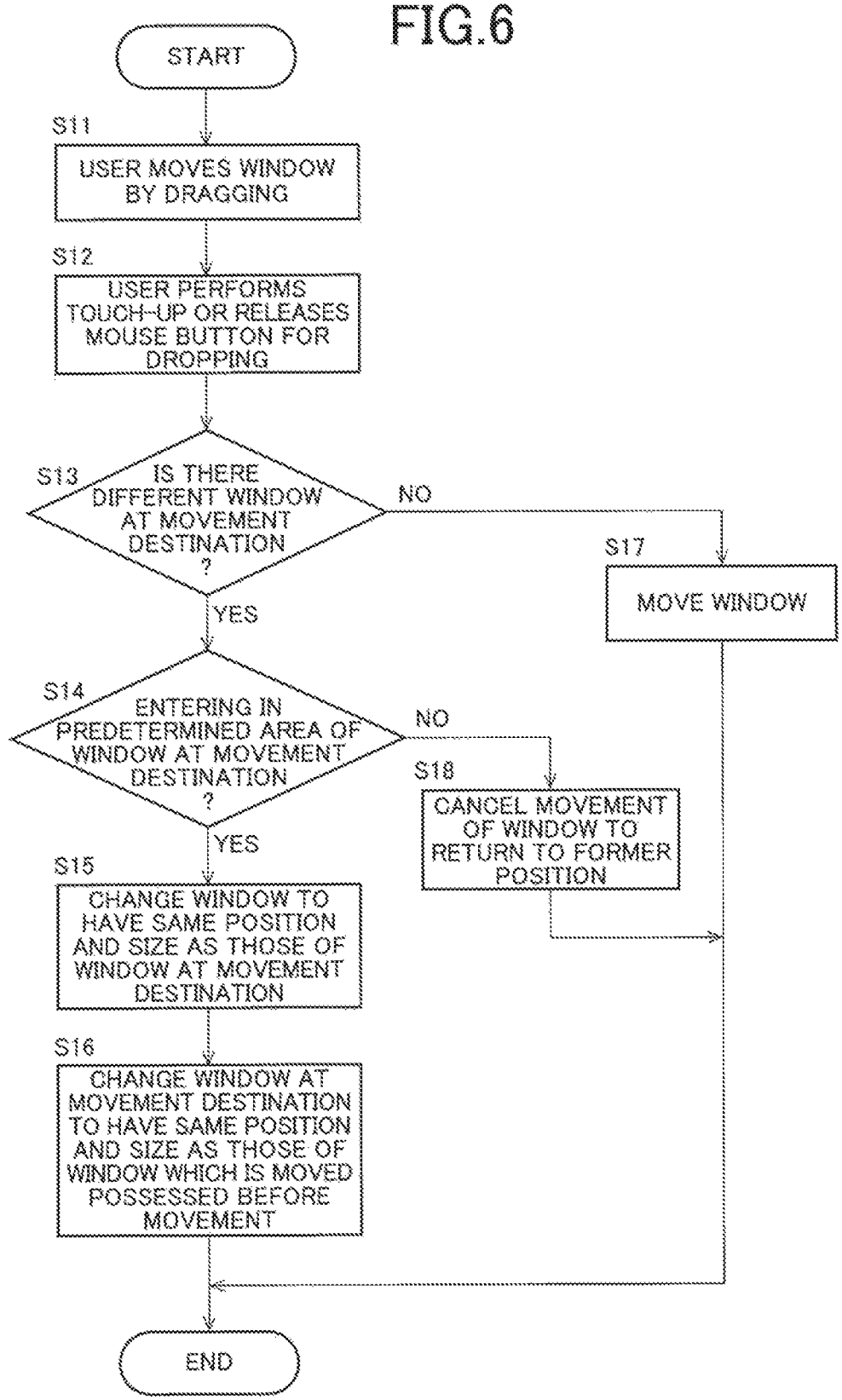

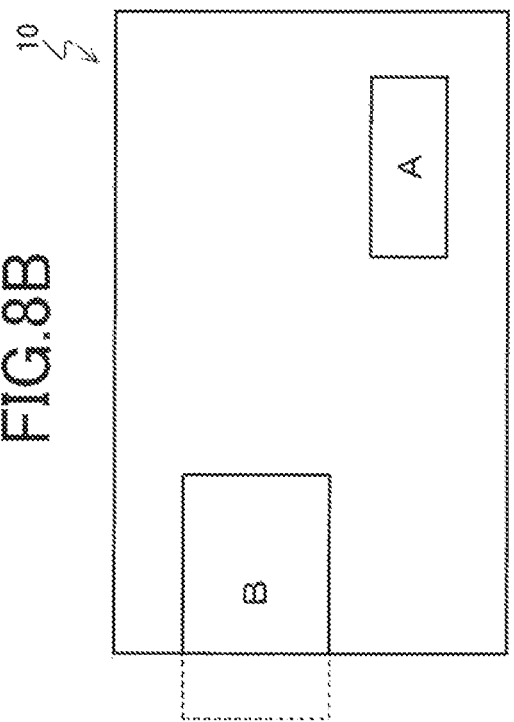
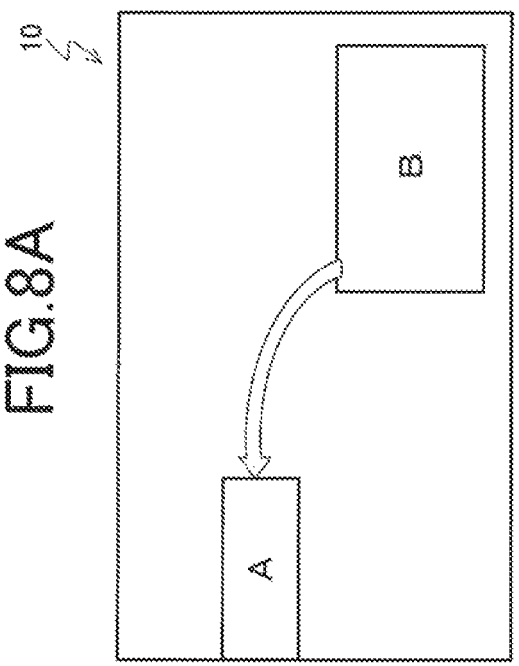
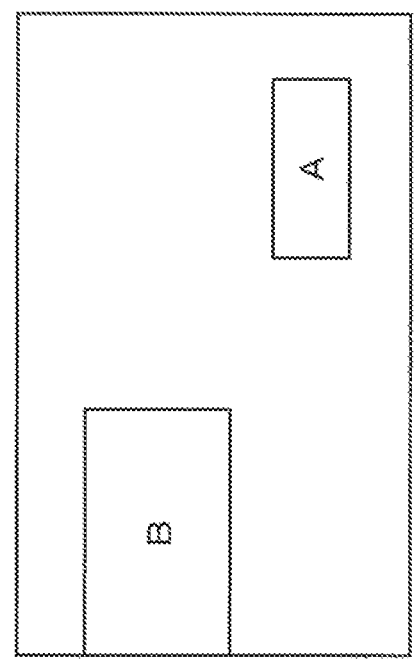

INFORMATION PROCESSING APPARATUS

CROSS-REFERENCE TO RELATED APPLICATIONS

This application is a Divisional of copending patent application Ser. No. 14/326,936, filed on Jul. 9, 2014, which claims priority under 35 U.S.C. § 119 (a) to Patent Application No. 2013-174352 filed in Japan on Aug. 26, 2013, the entire contents of which are hereby expressly incorporated herein by reference into the present application.

FIELD OF THE INVENTION

The present invention relates to an information processing apparatus, and more specifically to an information processing apparatus that performs display control of windows displayed by a window system.

BACKGROUND OF THE INVENTION

In a PC (Personal Computer), a tablet, a mobile terminal device and the like, a display form that a window is displayed on a display screen and an arbitrary application is executed by the window is generally prevalent. The window is an area given to the application on a device such as a display in a window system, and a plurality of applications run concurrently in a multi-task operating system, so that a screen area is allocated to each of the applications in the window to be switched by a user operation.

The window system is a mechanism on a computer in which a unique window is allocated to each of a plurality of tasks in parallel to multiplex screen output and software therefor, and provides a basic support for graphic hardware, a pointing device (such as mouse) and a keyboard.

As to a technology of display control of a system having a plurality of display areas, for example, Japanese Laid-Open Patent Publication No. 2004-29046 discloses a multi-display control system that when display control is performed in a multi-display system in which a plurality of image display apparatuses are connected, an operation screen is moved to the front of an operator when an application for performing a display operation is changed, thus making it unnecessary for the operator to move a display screen.

This system is provided with a main display apparatus and first and second sub-display apparatuses, for detecting where on one virtual page a mouse is and judging that the mouse exists on the second sub-display apparatus from the position detection result. When the judged operation screen is not the main display apparatus, then, screen contents of the second sub-display apparatus and screen contents of the main display apparatus are exchanged, to be displayed on respective display apparatuses. This makes it possible to arrange the operation area indicated by the mouse always on the front and operation efficiency of image display is improved.

FIG. 9A through FIG. 9D are diagrams explaining an example of a conventional operation of exchanging windows.

As described above, it is possible in the window system to display a plurality of windows on a device such as a display to execute applications at individual windows for operation. In a conventional window system, when display positions of individual windows are changed, the positions of the windows are able to be moved arbitrarily by a touch operation or a mouse operation.

For example, when it is desired to switch positions of two windows mutually for easy operation, however, a user needs an operation of moving the windows one by one individually, and further, when sizes of the windows are inappropriate, further setting the sizes of the windows after movement.

FIG. 9A through FIG. 9D show an operation of exchanging a window C and a window A when a plurality of windows A to F are displayed on a display screen 10. In this case, first, as shown in FIG. 9A, the user uses a touch panel function or the like to move the window C to a place of a movement destination by a drag and drop operation.

Further, when the size of the window C is small as shown in FIG. 9B, an operation of enlarging the size of the window C after movement to an appropriate size is performed. Thereafter, as shown in FIG. 9C, the window A is moved to a position of the window C occupied before movement by the drag and drop operation. Finally, as shown in FIG. 9D, an operation of reducing the size of the window A to an appropriate size is performed. The above-described operations require a cumbersome operation for the user, in spite of being the operations of exchanging the positions of two windows.

Moreover, the multi-display control system described in Japanese Laid-Open Patent Publication No. 2004-29046 above is for exchanging images displayed on a plurality of displays connected to a PC but not for exchanging display positions of windows in the window system.

SUMMARY OF THE INVENTION

An object of the present invention is to provide an information processing apparatus allowing exchange of windows by a window system to be easily executed with a simple operation.

An object of the present invention is to provide an information processing apparatus including a control portion that controls display of a predetermined display portion and an operation input portion that receives operation input by a user, the control portion displaying windows on the display portion and performing display control of the windows according to the operation input for the operation input portion, wherein the control portion moves a specific window displayed on the display portion according to the operation input for the operation input portion, and when the window which is moved is superimposed on a different window and a predetermined condition is satisfied, displays the different window at a position having been occupied before start of movement of the window which is moved and displays the window which is moved at a position of the different window to exchange the windows.

Another object of the present invention is to provide the information processing apparatus, wherein as the operation input portion, a touch operation portion that receives operation input by a touch portion allowing a touch operation and a pointing device operation portion that receives operation input by a pointer operated by a pointing device are included, the control portion, with respect to a window displayed on the display portion, sets a window exchange execution area of a predetermined range for performing control of window exchange in a range that does not exceed a whole area of the window, and when the specific window is moved by a drag operation with the touch portion or the pointer and the drag operation is stopped in the window exchange execution area, judges that the predetermined condition is satisfied.

Another object of the present invention is to provide the information processing apparatus, wherein when the specific window is moved by a drag operation with the touch portion or the pointer and the drag operation is stopped in an area outside the window exchange execution area, the control portion returns the specific window which is moved to a position having been occupied before start of movement of the window for displaying.

Another object of the present invention is to provide the information processing apparatus, wherein in the case of exchanging the windows, the control portion performs display with a size of the window which is moved being same as a size of the different window and performs display with the size of the different window being a size of the window which is moved having been possessed before start of movement.

Another object of the present invention is to provide the information processing apparatus, wherein in the case of exchanging the windows, when the window which is moved is a window which is predefined so that a size of the window is not able to be changed, the control portion displays the window which is moved, without changing the size thereof, at the position of the different window, and displays the different window at a position having been occupied before start of movement so that the size thereof becomes a size having been possessed before start of movement of the window which is moved.

Another object of the present invention is to provide the information processing apparatus, wherein when displaying the window which is predefined so that a size of the window is not able to be changed at the position of the different window without changing the size, the control portion adjusts a display position so that a whole area of the window whose size is not changed is displayed in a display screen of the display portion.

BRIEF DESCRIPTION OF THE DRAWINGS

FIG. 4 is a flowchart explaining a flow of processing in the first embodiment of the present invention;

FIG. 5A through FIG. 5C are diagrams explaining display control processing of a second embodiment of the present invention;

FIG. 6 is a flowchart explaining a flow of processing in the second embodiment of the present invention;

FIG. 8A through FIG. 8C are diagrams explaining display control processing of a fourth embodiment of the present invention.

PREFERRED EMBODIMENTS OF THE INVENTION

Figure 1:
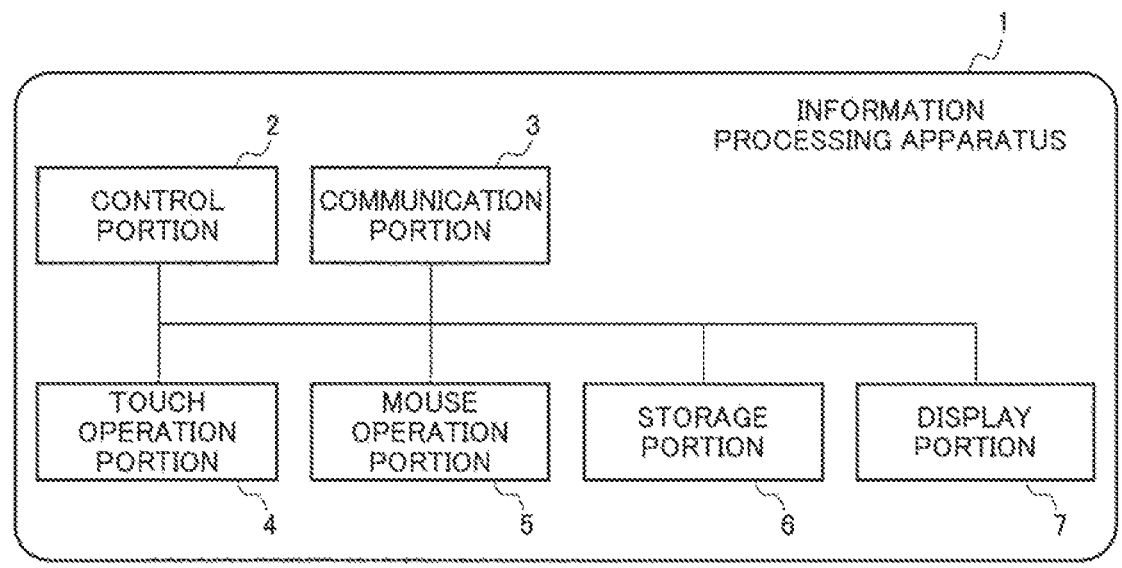
FIG. 1 is a block diagram showing a main configuration of an information processing apparatus according to the present invention.

FIG. 1 is a block diagram showing a main configuration of an information processing apparatus according to the present invention. An information processing apparatus 1 is provided with a control portion 2, a communication portion 3, a touch operation portion 4, a mouse operation portion 5, a storage portion 6, and a display portion 7.

The control portion 2 is composed of a control processor such as a CPU (Central Processing Unit), and controls each portion of the information processing apparatus 1 using a program and data stored in the storage portion 6 to realize functions thereof. The communication portion 3 is a communication interface for communicating with an external device.

The touch operation portion 4 is comprised of a touch panel sensor which is arranged on a surface of the display portion 7 and a detection circuit therefor. As the touch panel sensor, an electrostatic capacitance type is applicable that detects a position by capturing a change in electrostatic capacity between a fingertip and a conductive film. In addition to this, types such as a resistive film type for detecting voltage as an analog quantity by a resistive film, a surface elastic wave type (ultrasonic wave type) for detecting reflection of an oscillating wave by generation of voltage of a piezoelectric element, an infrared type for mainly detecting transmitted light and reflected light of an infrared LED light source, and an electromagnetic induction type for performing input by an electronic pen may be adopted.

The mouse operation portion 5 receives an operation by a mouse connected to the information processing apparatus 1. Specifically, the mouse operation portion 5 receives a movement operation of a pointer on a display screen by movement of the mouse, operations of click, pressing, dragging, dropping and the like by a button of the mouse, a scroll operation by a wheel, and the like to provide to the control portion 2.

The touch operation portion 4 and the mouse operation portion 5 correspond to an operation input portion of the present invention that receives operation input by a user. Moreover, the mouse operation portion 5 corresponds to a pointing device operation portion of the present invention for receiving operation input using a cursor which is a pointer. The pointing device is one of man-machine interfaces used mainly for operating a pointer and an icon displayed on a screen, and a joystick, a light pen, a touch pad, a track ball and the like are applicable in addition thereto.

The storage portion 6 is a storage portion that includes a ROM (Read Only Memory) and an HDD (Hard Disk Drive) that store programs, data and the like for realizing each function of the information processing apparatus 1, and a RAM (Random Access Memory) that provides the control portion with a work area.

The display portion 7 is a display device such as a liquid crystal panel. The control portion 2 operates a window system stored in the storage portion 6 and causes the display portion 7 to display one or more window. In an embodiment of the information processing apparatus according to the present invention, the display portion 7 is not an essential component, and may be one performing display control of windows using a specific external display device by the control portion 2.

When a user touches the display portion 7, the touch operation portion 4 detects input and provides the control portion 2 with information for specifying the input position (input coordinate information). Alternatively, the control portion 2 monitors input to the touch operation portion 4 by polling processing or the like.

In response to the detection of input by the touch operation portion 4, the control portion 2 acquires the input coordinate information which is detected, judges at which position on the display screen of the display portion 7 the input coordinate is, and performs processing according to display for the display screen of the display portion 7 based on the judgment result. A position of a pointer is detected similarly also for an operation for the mouse operation portion 5 to perform processing according to a position of the pointer.

For example, when an operation button displayed on the display screen of the display portion 7 is operated, the control portion 2 executes a processing program corresponding to the operation of the operation button. Further, the control portion 2 causes the display portion 7 to display one or more window according to start of an application or the like, and when a drag and drop operation is performed for the window, executes a processing program according to the operation and performs control to move the window to be operated on the screen.

In the embodiment according to the present invention, a window displayed on the display portion 7 is moved by an operation for the touch operation portion 4 or the mouse operation portion 5, and when the window which is moved is superimposed on a different window and a predetermined condition is satisfied, the window which is moved is displayed with the position thereof occupied before movement exchanged with that of the different window at a movement destination. Further, at this time, processing such as converting a size of the window possessed after movement and, when the window runs off the screen after movement, adjusting the position automatically so that the whole window is able to be displayed, is performed. Specific exemplary processing will be shown below.

Embodiment 1

Figure 2A:
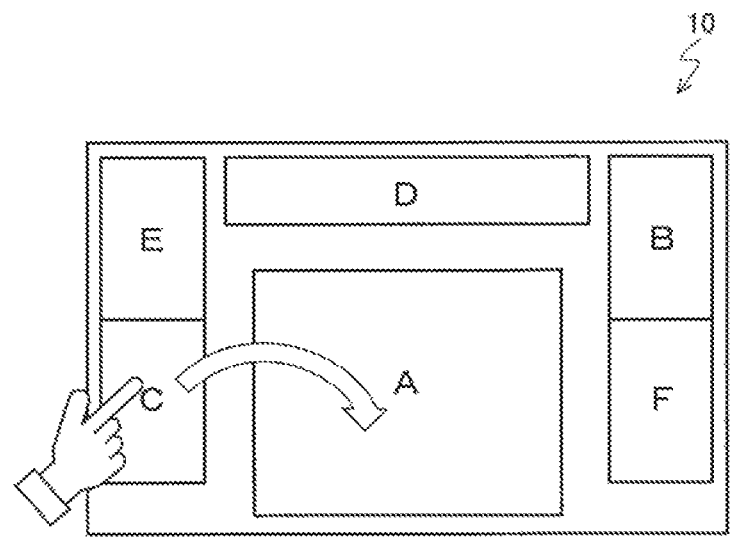
FIG. 2A and FIG. 2B are diagrams explaining display control processing of a first embodiment of the present invention.
Figure 2B:
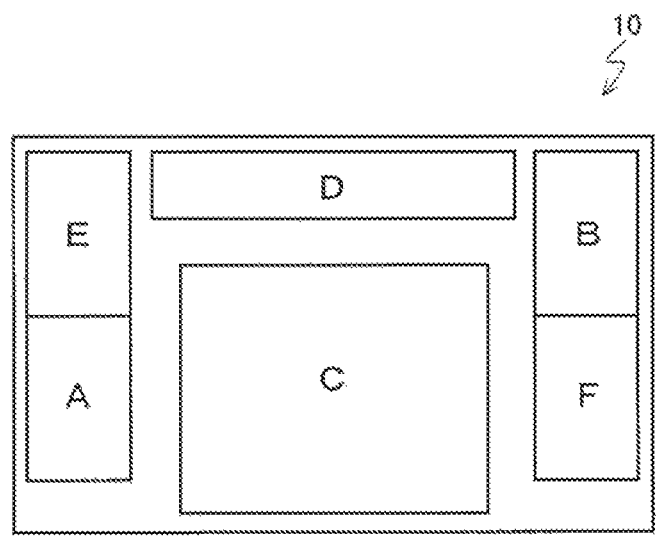

FIG. 2A and FIG. 2B are diagrams explaining display control processing of a first embodiment of the present invention, which show exemplary display control processing of a display screen displayed on the display portion 7 of the information processing apparatus 1. Description will be given with reference to the configuration of FIG. 1. A display screen 10 as shown in FIG. 2A and FIG. 2B is able to be displayed on the display portion 7. Control of the display portion 7 is executed by the control portion 2.

As shown in FIG. 2A, it is set that a plurality of windows A to F are displayed on the display screen 10. At this time, when a user performs an operation of exchanging the window C and the window A, the user performs a drag and drop operation by using a touch operation function by the touch operation portion 4 and moves the window C toward the window A serving as a movement destination. Then, as shown in FIG. 2B, when the window C is superimposed on the window A and the control portion 2 judges that a predetermined condition is satisfied, the control portion 2 displays the window C at a position where the window A has been displayed and displays the window A at a position of the window C occupied before movement. Then, the window C which is moved is regarded as an active window.

At this time, a size of the window C possessed after movement is adapted to a size of the window A possessed before movement for displaying, and the size of the window A possessed after movement is adapted to the size of the window C possessed before movement for displaying. That is, only the simple operation of moving the window C makes it possible to exchange the positions and sizes of the window C and the window A.

The above-described operation is able to be executed not only by the touch operation function for the touch operation portion 4 but also by a mouse operation with the mouse operation portion 5 similarly.

Figure 3A:
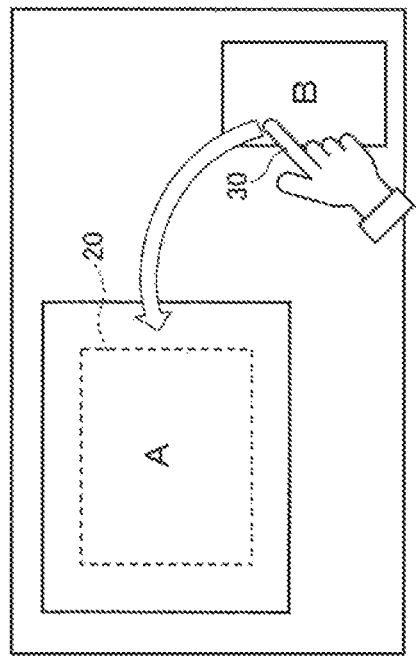
FIG. 3A through FIG. 3D are diagrams explaining a predetermined condition when positions of windows are switched.

FIG. 3A through FIG. 3D are diagrams explaining a predetermined condition when positions of windows are switched. Here, exemplary control processing when windows A and B displayed on the display portion 7 are exchanged is shown. In the present embodiment, a window exchange execution area of a predetermined range is set for all windows which are displayed. FIG. 3A shows a state where a window exchange execution area 20 is set to the window A, while it is also set to the window B similarly.

The window exchange execution area 20 is set to a range having an area with predetermined proportion of 100% or less, for example, with respect to the window A. For example, the window exchange execution area 20 is set to the rectangular window A, so that a vertical length and a horizontal length thereof become 70% of the original window, respectively.

Moreover, the window exchange execution area 20 is arranged in the center of the window A so that a length from an outer periphery of the window A to the window exchange execution area 20 becomes the same in horizontal and vertical directions of the window exchange execution area 2. Further, when the window A has a size smaller than a predetermined size, it may be set that the above-described predetermined proportion is not applied and the window exchange execution area 20 is defined with a predefined minimum size. At this time, when the size of the window A becomes smaller than the predefined minimum size, 100% of the area of the window A serves as the window exchange execution area 20.

The above-described exemplary setting is an example, and a size and a shape of the window exchange execution area 20 is able to be defined as appropriate in a predetermined range which does not exceed the whole area of the window. The window exchange execution area 20 is not made explicit so as to be visible by a user in each window, but is defined as an area to be judged by the control portion 2.

Figure 3B:
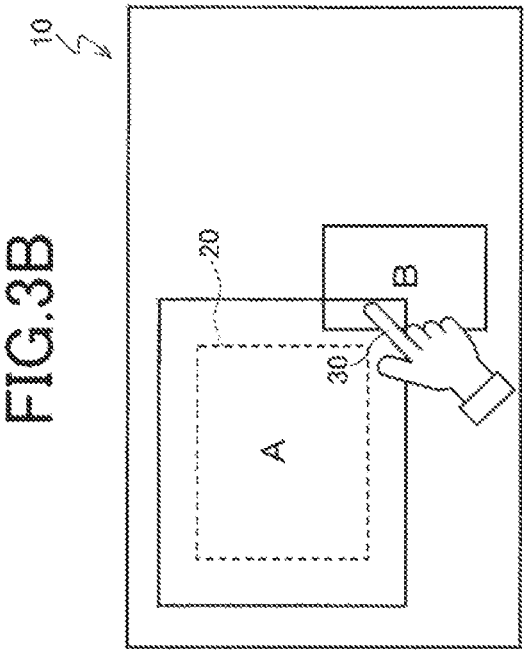

In addition, as shown in FIG. 3B, it is set that the window B is operated to be moved by the user and the window B is superimposed on the window A. Typically, when the windows are superimposed, the window which is positioned on the front side is displayed at the superimposed part, but the window on the rear side is also illustrated here for description (the same, hereinafter). In this case, the windows are not exchanged until a finger 30 performing a drag operation by touching enters in the window exchange execution area 20 of the window A. Note that, the finger 30 is an example of a touch portion allowing a touch operation and may be a device such as a touch pen, or the like. The same is applied, hereinafter.

Figure 3C:
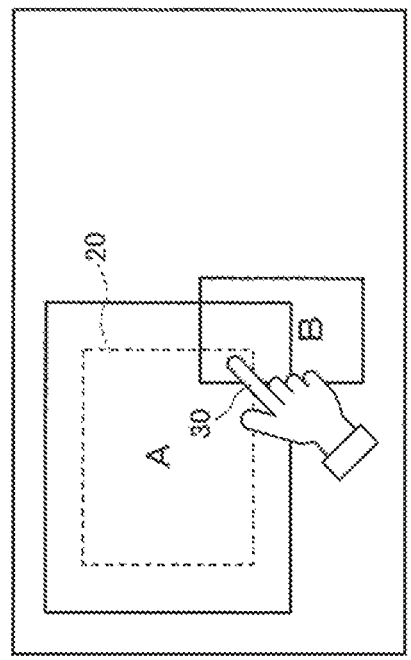
Figure 3D:
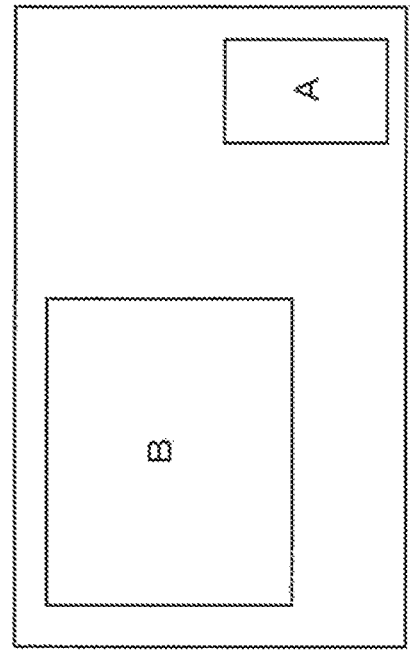

Further, as shown in FIG. 3C, when the finger 30 enters in the window exchange execution area 20 of the window A while the drag operation is being continued and the user separates the finger 30 and performs a drop operation to stop the drag operation, the control portion 2 judges that the predetermined condition of window exchanging is satisfied. Here, as shown in FIG. 3D, the control portion 2 displays the window B at the position of the window A which has been displayed before movement, and displays the window A at the position of the window B which has been displayed before movement at the same time. Further, at this time, the size of the window B possessed after movement is equalized with the size of the window A possessed before movement and the size of the window A possessed after movement is equalized with the size of the window B possessed before movement.

In a case where a size of a window is changed before and after movement according to the present embodiment, similarly to a case where a size of a window is changed by a normal window operation, the size displayed by being cut by the window is changed simply, without changing information itself displayed in the window. At this time, a whole area of display information, when being not able to be displayed depending on the window, is able to be displayed by using a scroll bar. The scroll bar is a GUI (Graphical User Interface) part for mainly displaying only an area of a part of information which is not able to be fallen in a single window in the window system to move a display area as necessary, and two types of a horizontal direction and a vertical direction are set.

In the above-described display control, the user moves a window by a drag operation using the touch operation function, and when a finger or the like enters in the window exchange execution area 20 of a different window, separates the finger or the like from the screen and performs a drop operation, thereby it is decided to execute control of window exchange for the first time. For example, when the finger or the like enters in the window exchange execution area 20 of the different window once while the drag operation is being continued, and then, the finger or the like moves outside the window exchange execution area 20 while the drag is being continued without separating the finger or the like, and dropping is performed there, window exchange is not executed.

When the same operation is executed by a mouse operation function, the user moves a cursor which is displayed onto an arbitrary window, and performs a drag operation while a predetermined button of the mouse is being pressed to thereby move the window. Further, when the cursor enters in the window exchange execution area 20 of a different window, a drop operation for stopping the drag operation is performed by separating the button, so that the predetermined condition is satisfied. Thereby, the control portion 2 executes exchange and display of the windows.

Since the window exchange execution area 20 is not displayed explicitly on the screen, display may be performed so that the user is able to recognize whether or not the finger or the like or the cursor enters in the window exchange execution area 20. For example, while a window is being moved by a drag operation, window display is not particularly changed, and when the finger or the like or the cursor performing the drag operation enters in the window exchange execution area 20 of a window of a movement destination, display which is visually discriminable is performed in the window. For example, it is possible that a predetermined mark is displayed in the center of the window so that the user is informed that window exchange is executed by performing a drop operation in this state.

Moreover, in the present embodiment, though windows are displayed with positions and sizes thereof are changed when the windows are exchanged, as a modification example, control may be performed so that only positions of two windows are exchanged and sizes of the windows are not changed.

Moreover, in the present embodiment, though only a size of a window is changed without enlarging/reducing information in the window when the size of the window is changed before and after movement, as a modification example, display may be performed so that information in the window is enlarged or reduced according to contents of the information of the window. For example, when a television picture is being displayed in a window, if window exchange is performed and a size of the window is changed, the television picture may be reduced or enlarged to be displayed. In this case, such control processing is able to be performed that the size of the window is changed but an aspect ratio is kept without being changed.

FIG. 4 is a flowchart explaining a flow of processing in the first embodiment of the present invention. Here, description will be given with reference to FIG. 1 as a main part of the processing.

First, in a state where a plurality of windows are displayed on the display portion 7, a user uses the touch function or the mouse function to perform a drag operation and move an arbitrary window (step S1). The user then performs touch-up (releases the touch) or releases a mouse button for dropping (step S2).

At this time, the control portion 2 of the information processing apparatus 1 judges whether or not there is a different window at a movement destination of the window moved by the user operation (step S3). Here, when there is not a different window at the movement destination, the window is moved to the dropped position (step S7).

Further, when there is a different window at the movement destination at step S3, the control portion 2 judges whether or not a touching finger or the like or a cursor performing a mouse operation enters in a predetermined area of the different window at the movement destination (step S4). The predetermined area is an area corresponding to the window exchange execution area described above.

Here, when the finger or the like or the cursor does not enter in the predetermined area of the window at the movement destination (step S4—No), the control portion 2 moves the window to the dropped position for displaying (step S8).

Further, when the finger or the like or the cursor enters in the predetermined area of the window at the movement destination at step S4 (step S4—Yes), the control portion 2 changes the window which is moved to have the same position and size as those of the window at the movement destination for displaying (step S5). Then, the window which has been at the movement destination is changed to have the position and size of the window which is moved occupied and possessed before movement for displaying (step S6).

Embodiment 2

FIG. 5A through 5C are diagrams explaining display control processing of a second embodiment of the present invention. In the present embodiment as well, similarly to the embodiment 1, a window exchange execution area of a predetermined range is set for all windows which are displayed on the display screen 10 of the display portion 7. FIG. 5A shows a state where a window exchange execution area 20 is set to a window A, while it is also set to a window B similarly.

Further, as shown in FIG. 5B, it is set that the window B is operated to be moved by a user. In this case, similarly to the embodiment 1, window exchange is not performed until a finger 30 (which may be also a touch pen or the like instead) performing a drag operation by using the touch operation function enters in the window exchange execution area 20 of the window A. Then, by performing a drop operation when the finger 30 enters in the window exchange execution area 20 of a different window, it is decided to execute control of window exchange. Here, the operation may be performed not by the finger 30 but other pointing device or the like, or may be an operation using the mouse operation function. This display control processing is the same as the embodiment 1.

As shown in FIG. 5B, when the finger 30 is outside the window exchange execution area 20 and performs a drop operation at the position, window exchange is not executed and the window B is displayed with a remaining size at the dropped position in the embodiment 1.

On the contrary, in the present embodiment, when the window B is moved by a drag operation and the drag operation is stopped by a drop operation, if the finger 30 does not enter in the window exchange execution area 20 of the different window A, all movement operations so far are cancelled and the window is returned to an original position occupied before movement and displayed. In this case, when the drop operation is performed in the state of FIG. 5B, it is automatically returned to the state before start of movement of FIG. 5C for displaying. This is the same as well in a drag and drop operation using the mouse function.

Here, even when the finger or the like enters in the window exchange execution area 20 of the different window once while the drag operation is being continued, and then, the finger or the like or the cursor moves outside the window exchange execution area 20 while the drag is being continued as it is, and dropping is performed there, window exchange is not executed and the window is returned to an original position occupied before movement and displayed.

In the present embodiment, when a user who has started movement of a window once changes his/her objective halfway to perform a drop operation at an arbitrary position outside a different window without selecting window exchange, it is possible to return arrangement of the window to the position occupied before movement is started and improve usability.

FIG. 6 is a flowchart explaining a flow of processing in the second embodiment of the present invention. Processing of steps S11 to 17 of the figure is the same as the embodiment 1. That is, in a state where a plurality of windows are displayed on the display portion 7, a user uses the touch function or the mouse function to perform a drag operation and move an arbitrary window (step S11). The user then performs touch-up (release the touch) or releases a mouse button for dropping (step S12).

The control portion 2 judges whether or not there is a different window at a movement destination of the window moved by the user operation (step S13), and when there is not a different window at the movement destination, the window is moved to the dropped position (step S17). Further, when there is a different window at the movement destination at step S13, the control portion 2 judges whether or not a touching finger or the like or a cursor performing a mouse operation enters in a predetermined area (window exchange execution area) of the different window at the movement destination (step S14).

In addition, in the present embodiment, when the finger or the like or the cursor does not enter in the predetermined area of the window at the movement destination (step S14—No), the control portion 2 cancels movement of the window and returns the window which is moved to the former position occupied before movement for displaying (step S18).

Further, when the finger or the like or the cursor enters in the predetermined area of the window at the movement destination at step S14, the control portion 2 changes the window which is moved to have the same position and size of the window at the movement destination for displaying (step S15). Then, the window which has been at the movement destination is changed to have the position and size of the window which is moved occupied and possessed before movement for displaying (step S16).

Embodiment 3

Figure 7A:
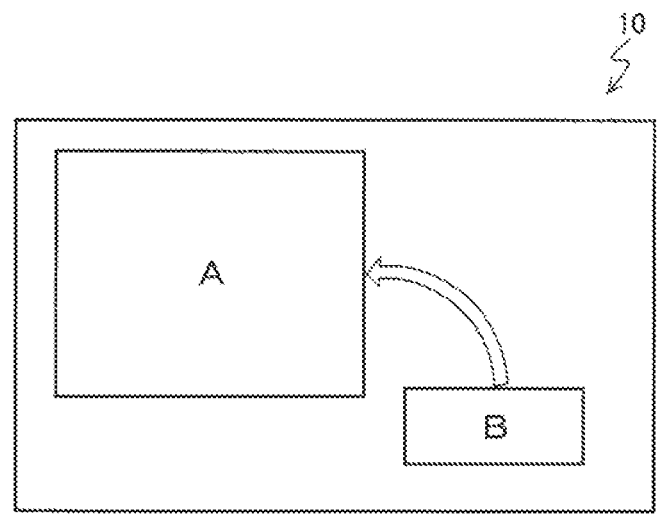
FIG. 7A and FIG. 7B are diagrams explaining display control processing of a third embodiment of the present invention.
Figure 7B:
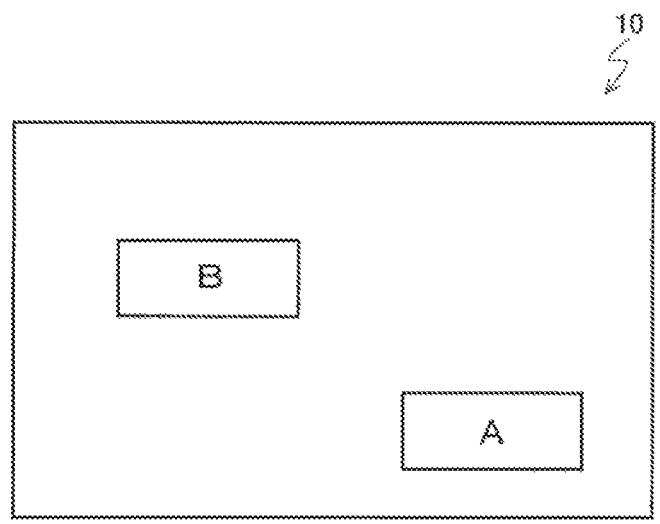
Figure 9A:
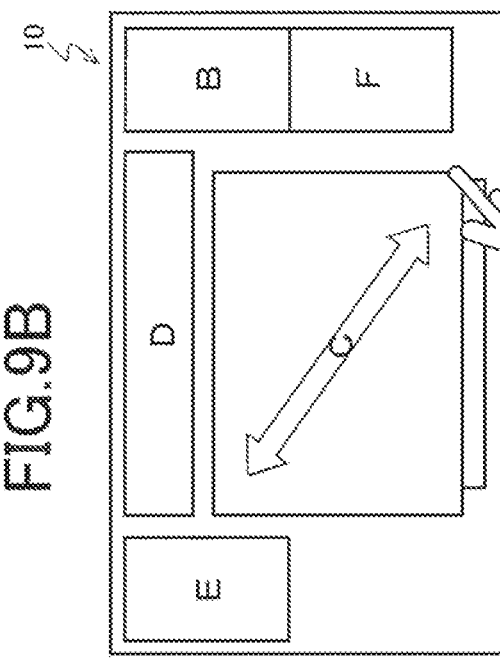
FIG. 9A through FIG. 9D are diagrams explaining an example of a convention operation of exchanging windows.
Figure 9B:
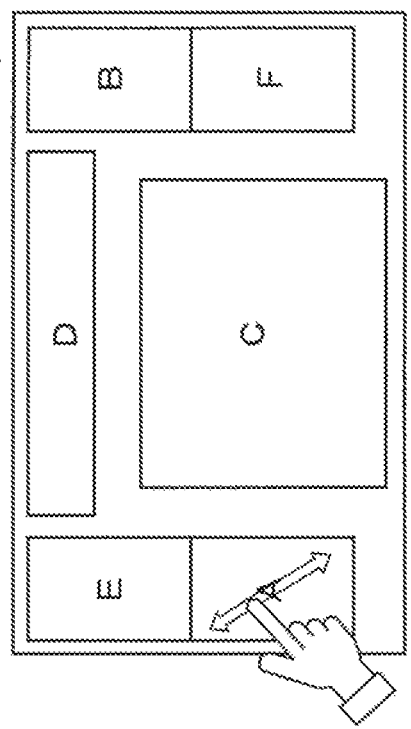
Figure 9C:
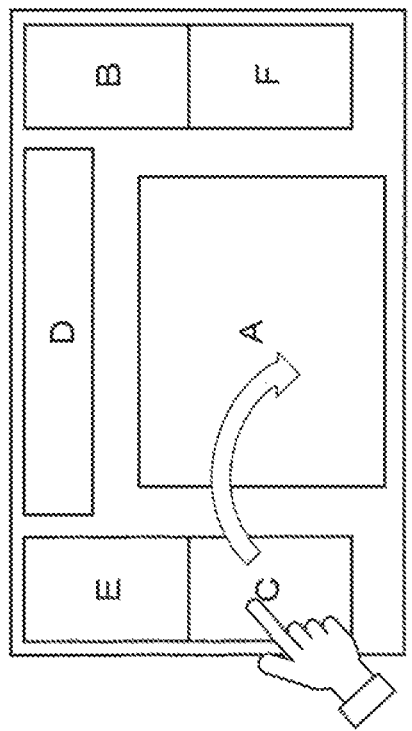
Figure 9D:

FIG. 7A and FIG. 7B are diagrams explaining display control processing of a third embodiment of the present invention.

In the present embodiment, when window exchange is performed by the control processing of the above-described embodiments 1 and 2, in the case of a window which is predefined so that a size of the window is not able to be changed, at a time of exchanging windows to move positions, only the positions are moved as they are without changing sizes of the windows.

For example, as shown in FIG. 7A, it is set that a window A and a window B that have different sizes are exchanged. In the window exchange, like the above-described embodiments, a finger or the like or a cursor in the window B to be moved by a drag operation is dragged to a window exchange execution area of the window A at a movement destination, and when a drop operation is performed there, the window B is displayed at a position of the window A and the window A is displayed at a position of the window B occupied before movement.

There is a case where a window which is displayed at this time is a window whose window size is not able to be changed. In the window system, a window which is fixed so that a size thereof is not able to be changed in advance with respect to a specific window is sometimes displayed. For example, a window of software, a window of property, a dialogue and the like whose window sizes are fixed are exemplified.

In this example, it is set that the window B is a window whose window size is not able to be changed. In this case, when window exchange is performed, as shown in FIG. 7B, the window B is displayed at the position at which the window A has been, whereas the window B is changed only in the position thereof, and a size of the window is kept with the former size. When changing the positions, a center of the original window A and a center of the window B after the exchange are matched. In addition to this, the positions may be determined as appropriate by a method of matching specific vertexes before and after the exchange or the like.

On the other hand, since the window A is not a window whose window size is fixed, when the window A is displayed at the position of the window B occupied before movement by the window exchange, the window A is displayed according to the size of the window B possessed before movement.

This control processing makes it possible to execute window exchange easily in the window system even when there is a window whose window size is not able to be changed.

Embodiment 4

FIG. 8A through FIG. 8C are diagrams explaining display control processing of a fourth embodiment of the present invention.

In the present embodiment, in the case of a window whose window size is not able to be changed when window exchange is performed by the control processing of the above-described embodiment 3, if a window runs off a screen at a time of performing window exchange to move positions, adjustment is performed to displace the display positions so that the entire window is displayed.

For example, as shown in FIG. 8A, it is set that a window A and a window B that have different sizes are exchanged. In the window exchanging, like the above-described embodiments, a finger or the like or a cursor in the window B to be moved by a drag operation is dragged to a window exchange execution area of the window A at a movement destination, and when a drop operation is performed there, the window B is displayed at a position of the window A and the window A is displayed at a position of the window B occupied before movement.

As shown in FIG. 8B, the window B which is displayed at this time is a window whose window size is not able to be changed, and when the window B is displayed at the position of the window A, the window B sometimes runs off the screen. For example, in a case where it is defined, at a time of exchanging the window A for the window B, that window exchange is performed with centers of the windows matched, when the window B whose size is not able to be changed is larger than the window A, if the window B is displayed so as to have the center matched with the center of the window A occupied before movement by window exchange, a part of the window B becomes impossible to be displayed on the screen.

In this case, in the present embodiment, as shown in FIG. 8C, until a whole area of the window B, a part of which is not to be displayed by the window exchange, is displayed, the display position of the window B is adjusted. Though the window B is displayed at the position of the window A occupied before exchange when performing the window exchange, the whole area thereof is adjusted to be displayed on the screen while being overlapped with an area of the window A occupied before the exchange.

This control processing makes it possible to execute window exchange easily in the window system even when there is a window whose window size is not able to be changed, and at this time, it becomes possible to display the entire window existed after the exchange in the screen at all times.

Embodiment 5

In the present embodiment, control of window exchange by each of the above-described embodiments is enabled to be executed according to mode setting for an information processing apparatus.

For example, as a mode set to the information processing apparatus, a normal mode and a window exchange mode are prepared so as to be selectable by a user. At this time, it is also possible that a mode setting switch is displayed in a screen and mode selection is enabled according to the operation.

In the normal mode, a conventional operation based on display information of a window is enabled. Here, it is possible to operate an icon, a button or the like displayed in the window, to perform an operation of inputting text or the like, and the like. Moreover, it is possible to move the window or change a size thereof, and when the window is moved, window exchanging processing is not performed and the window is displayed at a position of a movement destination.

Then, when the window exchanging mode is set by an operation of the user, control of exchange and display of windows is executed by each of modes of the above-described embodiments.

When the window exchanging mode is set, a display form of a window is able to be changed. As an example thereof, in the window exchanging mode, for example, an outer frame of each window is turned to, for example, a black frame so that states of the windows are made explicit in a distinguishable manner. In this case, an operation for information of an icon or the like displayed in the window whose frame is displayed in black becomes impossible. In order to further show that the operation is impossible, processing such as coloring inside the window in gray for displaying may be performed.

Then, it is enabled to move the window by performing a drag operation, even if touching is performed to any part in the window or wherever a cursor is. Moreover, it is enabled to change a size of the window by touching the black frame.

In this state, when a user performs a drag operation for an arbitrary window and performs a drop operation in a window exchange execution area of a window at a movement destination, the windows are exchanged and displayed.

Moreover, the window exchanging mode may be allowed to be set by being classified into two.

For example, in a first mode of the window exchanging mode, the operation of the above-described embodiment 1 is performed, in which when a window is dragged to be moved, and dropped outside a window exchange execution area of a different window, the window which is moved is displayed as it is at the dropped position.

Moreover, in a second mode of the window exchanging mode, the operation of the above-described second embodiment is performed. Here, when a window is dragged to be moved, and dropped outside a window exchange execution area of a different window, all movement operations so far are cancelled and the window is returned to an original position occupied before movement and displayed.

As described above, by enabling to execute control of window exchange with a predetermined mode, each of operations of moving and exchanging windows and an operation for the windows become possible to be executed easily, thus making it possible to improve convenience of a user.

Technical features (components) described in each of the above-described embodiments are able to be combined with each other, and such combination makes it possible to form a new technical feature.

As above, according to the present invention, it is possible to provide an information processing apparatus allowing exchange of windows by a window system to be easily executed with a simple operation.

The invention claimed is:

1. An information processing apparatus comprising:
a control processor and a storage device storing programs which the control processor executes to realize the following functions of the information processing apparatus:
displaying windows on a display device, and
receiving touch operation input by a user through a touch panel sensor, wherein
the control processor sets to each of the windows a predetermined area which does not exceed the whole area of the window and moves the windows according to touch operations for moving the windows for displaying,
when a specific window is superimposed on a different window by a touch operation of the specific window and the touch operation is stopped where the specific and different windows are superimposed on each other, and when it is judged that the touch operation is stopped in the predetermined area of the different window, exchanges the specific window and the different window for displaying, and when it is judged that the touch operation is stopped but not in the predetermined area, displays the specific window at a position having been occupied before start of the touch operation.

2. The information processing apparatus according to claim 1, wherein the control processor sets a window exchange execution area for each window displayed on the display device, where the window exchange execution area is a predetermined range for performing control of window exchange in a range that is less than a whole area of the window, and when the specific window is moved by a drag operation with the touch panel sensor, exchanges the specific window and the different window for displaying when the drag operation is stopped in the window exchange execution area.

3. The information processing apparatus according to claim 2, wherein when the specific window is moved by the drag operation with the touch panel sensor and the drag operation is stopped in an area outside the window exchange execution area, the control processor returns the specific window to a position having been occupied before start of the drag operation for displaying.

4. The information processing apparatus according to claim 1, wherein when the specific window is superimposed on the different window by the touch operation and the touch operation is stopped, the control processor exchanges the specific window and the different window for displaying and the specific window which has been exchanged for displaying is regarded as an active window.

5. The information processing apparatus according to claim 1, wherein in the case of exchanging the windows, the control processor performs display with a size of the specific window which is moved being same as a size of the different window and performs display with the size of the different window being a size of the specific window which is moved having been possessed before start of movement.

6. The information processing apparatus according to claim 1, wherein when the size of the window is changed before and after window exchange, the control processor performs display that information in the window is enlarged or reduced according to contents of the information of the window.

7. The information processing apparatus according to claim 1, wherein a normal mode and a window exchanging mode which are selectable by a user are set to the information processing apparatus, when the normal mode is selected and the touch operation of the specific window is detected, the specific window is displayed at a movement destination, and when the window exchanging mode is selected and the specific window is superimposed on the different window by the touch operation of the specific window, and when it is judged that the touch operation is stopped in the predetermined area, the specific window and the different window are exchanged for displaying.

8. A method for display control of windows comprising:
displaying windows on a display device,
receiving touch operation input by a user through a touch panel sensor,
setting to each of the windows a predetermined area which does not exceed the whole area of the window and moving the windows according to touch operations for moving the windows received through the touch panel sensor for displaying,
when a specific window is superimposed on a different window by a touch operation of the specific window and the touch operation is stopped where the specific and different windows are superimposed on each other, and when the touch operation is stopped in the predetermined area of the different window, exchanging the specific window and the different window for displaying, and
when it is judged that the touch operation is stopped but not in the predetermined area, displaying the specific window at a position having been occupied before start of the touch operation.

9. A non-transitory computer-readable recording medium storing a program causing a computer to execute a process, the process comprising:
displaying windows on a display device,
receiving touch operation input by a user through a touch panel sensor,
setting to each of the windows a predetermined area which does not exceed the whole area of the window and moving the windows according to touch operations for moving the windows received through the touch panel sensor for displaying,
when a specific window is superimposed on a different window by a touch operation of the specific window and the touch operation is stopped where the specific and different windows are superimposed on each other, and when it is judged that the touch operation is stopped in the predetermined area of the different window, exchanging the specific window and the different window for displaying, and
when it is judged that the touch operation is stopped but not in the predetermined area, displaying the specific window at a position having been occupied before start of the touch operation.

* * * * *